US012568154B2

(12) United States Patent
Ramarao et al.

(10) Patent No.: US 12,568,154 B2
(45) Date of Patent: Mar. 3, 2026

(54) COMPUTERIZED SYSTEM AND METHOD FOR ON-DEVICE CONTENT PERSONALIZATION

(71) Applicant: YAHOO AD TECH LLC, Dulles, VA (US)

(72) Inventors: Prashant Ramarao, Fremont, CA (US); Daryl Low, San Jose, CA (US); Sanika Shirwadkar, Milpitas, CA (US); Xiaoyan Yin, Fairfax Station, VA (US); Nils Schimmelmann, Mountain View, CA (US); Looja Tuladhar, Sunnyvale, CA (US)

(73) Assignee: YAHOO AD TECH LLC, New York, NY (US)

( * ) Notice: Subject to any disclaimer, the term of this patent is extended or adjusted under 35 U.S.C. 154(b) by 0 days.

(21) Appl. No.: 17/380,076

(22) Filed: Jul. 20, 2021

(65) Prior Publication Data

US 2023/0029333 A1    Jan. 26, 2023

(51) Int. Cl.
| | |
|---|---|
| *G06F 16/9035* | (2019.01) |
| *G06F 16/908* | (2019.01) |
| *G06F 16/9535* | (2019.01) |
| *H04L 67/306* | (2022.01) |
| *H04L 67/60* | (2022.01) |

(52) U.S. Cl.
CPC ............. *H04L 67/60* (2022.05); *H04L 67/306* (2013.01)

(58) Field of Classification Search
CPC ...... G06Q 10/10; G06Q 30/00; G06Q 50/265;
G06F 16/24578; G06F 16/335; G06F
16/90348; G06F 16/9035; G06F 16/9038;
G06F 16/908; G06F 16/9535; G06F
16/248; G06F 16/958; G06F 16/3323;
G06F 16/337; G06F 16/338; G06F
16/9538; G06F 18/24; H04N 21/4532;
H04N 21/4755
See application file for complete search history.

(56) References Cited

U.S. PATENT DOCUMENTS

| | | | | |
|---|---|---|---|---|
| 2004/0068552 A1* | 4/2004 | Kotz | ................... | H04L 67/2842 |
| | | | | 709/218 |
| 2011/0055914 A1* | 3/2011 | Sugahara | .............. | H04L 67/306 |
| | | | | 726/12 |
| 2011/0296463 A1* | 12/2011 | Suslov | ................... | G06F 16/25 |
| | | | | 707/E17.014 |

(Continued)

*Primary Examiner* — Nicholas R Taylor
*Assistant Examiner* — Ho T Shiu
(74) *Attorney, Agent, or Firm* — James J. DeCarlo; Greenberg Traurig, LLP

(57) ABSTRACT

The disclosed systems and methods provide a novel framework that provides on-device functionality to user devices for localized content ranking, modification and rendering. The disclosed systems and methods provide functionality for on-device personalization in a real-time, secure and network anonymous manner. Rather than exposing a user's data to the network for content tailoring, the disclosed framework performs the ranking and content manipulation locally on the user's device. The disclosed framework enables locally (on-device) built, updated and hosted user profiles to be used to tailor received content for display on a user device. This ensures the integrity of the personalization while maintaining security for the user's personalized data and activities.

20 Claims, 4 Drawing Sheets

(56) References Cited

U.S. PATENT DOCUMENTS

| | | | |
|---|---|---|---|
| 2011/0313994 A1* | 12/2011 | Varshavsky | G06F 16/9535 |
| | | | 707/707 |
| 2012/0054144 A1* | 3/2012 | Barbieri | H04N 21/458 |
| | | | 706/52 |
| 2012/0109966 A1* | 5/2012 | Liang | G06F 16/954 |
| | | | 707/E17.014 |
| 2015/0242496 A1* | 8/2015 | Schlesinger | G06F 16/335 |
| | | | 707/754 |
| 2017/0109444 A1* | 4/2017 | Modarresi | G06Q 30/0282 |
| 2020/0301973 A1* | 9/2020 | Sewani | G06F 16/9035 |

* cited by examiner

FIG. 4      400

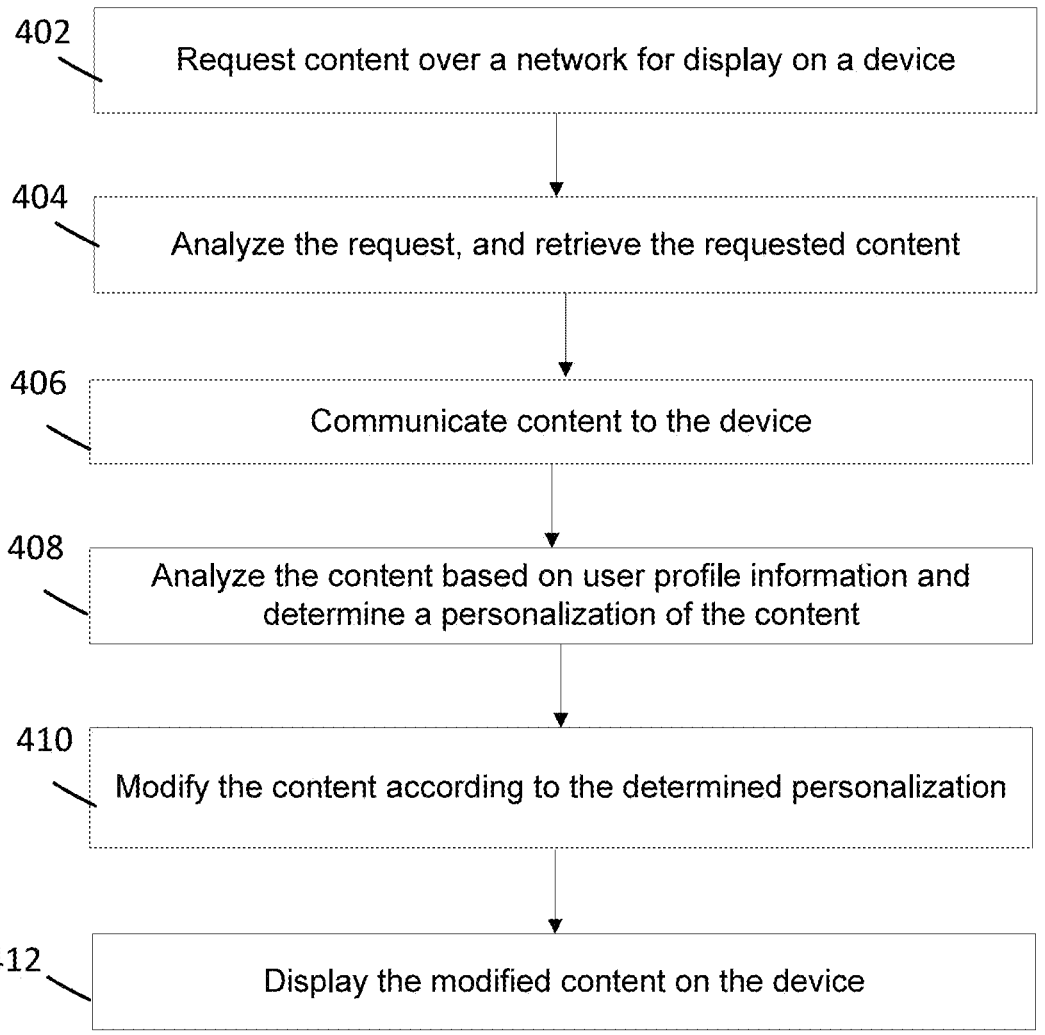

402   Request content over a network for display on a device

404   Analyze the request, and retrieve the requested content

406   Communicate content to the device

408   Analyze the content based on user profile information and determine a personalization of the content 410   Modify the content according to the determined personalization 412   Display the modified content on the device

COMPUTERIZED SYSTEM AND METHOD FOR ON-DEVICE CONTENT PERSONALIZATION

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to personalizing content displayed on a user device, and more particularly, to providing on-device functionality to user devices for localized content ranking, modification and rendering.

BACKGROUND

Conventional techniques for providing content and product recommendations, and even providing advertisements to users, are based on cloud-computing solutions that involve tracking users activities on a network via network hosted engines, and communicating tailored content to the user's device for rendering. This, however, has drawbacks, rooted in a strict reliance on network connectivity availability, as well as concerns for the security of user data being held private or protected from malicious actors (or even unwanted third parties).

SUMMARY

The disclosed systems and methods provide a novel framework that addresses these shortcomings, among others, by providing functionality for on-device personalization in a secure, network anonymous manner. Rather than exposing a user's data to the network for content tailoring, the disclosed framework performs the ranking and content personalization locally on the user's device. This prevents user data from being exposed to the network "mine-field" of malicious actors, malware and unsecured connections, as personal user data is securely maintained on the device without a need or risk of exposure during the reception and personalization process.

Personalization of content, products and/or offers has been traditionally performed by tracking a user's interaction with an application, and leveraging trained machine learning (ML) models to compute user interest, and predict and optimize for particular outcomes. For example, identifying and tracking which articles the user has read and using this as a signal to compute user interest based on the content and/or context of the article. The key drivers of this conventional approach are, primarily, because using ML techniques requires big-data infrastructure; that is, for example, access to large volumes of data, and large amounts of computing resources to train ML models.

The disclosed framework provides novel techniques that conventional systems are incapable of performing under traditional assumptions. The disclosed systems and methods create personalized on-device experiences, rather than relying on cloud-based solutions to drive and deliver them to the devices. Moreover, the disclosed framework improves the speed and efficiency in how content is personalized and delivered to users since most of the computation to personalize content is performed on the device. The personalization can be performed in real-time (or near real-time), rather than having to wait for a network device to compute and deliver content, which can be subject to poor network conditions such as low bandwidth and/or high network latency.

According to some embodiments, while the discussion herein may be focused on embodiments for receiving and/or fetching information (e.g., content) from a server through one or more application program interfaces (APIs), it should not be construed as limiting, as the on-device personalization of content performed locally, as discussed herein, can be resultant of the reception and/or fetching of content in any known or to be known operating environment, including, but not limited to, peer-to-peer (P2P), Internet of Things (IoT), streaming, offline, and the like, or some combination thereof. For example, the disclosed framework can operate where a client device receives networked content from a server, then shares it to another client device (e.g., a P2P client or connected IoT device, for example); and the other client device can then perform the on-device personalization discussed herein. One of skill in the art would understand that the instant disclosure covers such embodiments, as they do not depart from the disclosed scope detailed herein.

In accordance with one or more embodiments, the present disclosure provides computerized methods for a novel framework that provides on-device functionality to user devices for localized content ranking, modification and rendering.

In accordance with one or more embodiments, the present disclosure provides a non-transitory computer-readable storage medium for carrying out the above mentioned technical steps of the framework's functionality. The non-transitory computer-readable storage medium has tangibly stored thereon, or tangibly encoded thereon, computer readable instructions that when executed by a device (e.g., a client device) cause at least one processor to perform a method for a novel and improved framework that provides on-device functionality to user devices for localized content ranking, modification and rendering.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 4 is a block diagram illustrating an exemplary data flow in accordance with some embodiments of the present disclosure.

DESCRIPTION OF EMBODIMENTS

Figure 1:
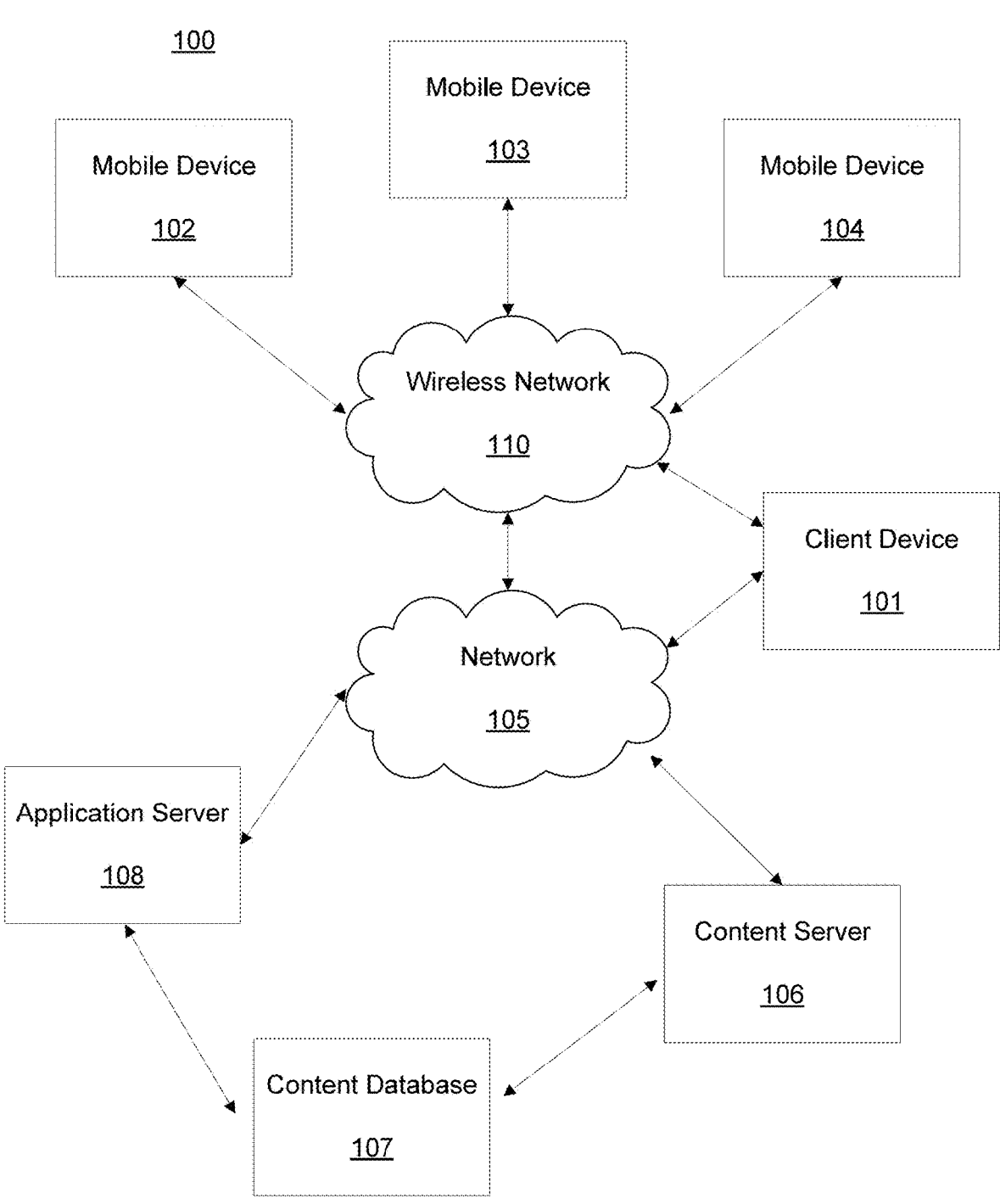
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/ acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, $4^{th}$ or $5^{th}$ generation (2G, 3G, 4G or 5G) cellular technology, mobile edge computing (MEC), Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

As discussed herein, reference to an "advertisement" should be understood to include, but not be limited to, digital media content embodied as a media item that provides information provided by another user, service, third party, entity, and the like. Such digital ad content can include any type of known or to be known media renderable by a computing device, including, but not limited to, video, text, audio, images, and/or any other type of known or to be known multi-media item or object. In some embodiments, the digital ad content can be formatted as hyperlinked multi-media content that provides deep-linking features and/ or capabilities. Therefore, while some content is referred to as an advertisement, it is still a digital media item that is renderable by a computing device, and such digital media item comprises content relaying promotional content provided by a network associated party.

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106 and application (or "App") server 108.

One embodiment of mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information, as discussed above.

Mobile devices 102-104 also may include at least one client application that is configured to receive content from another computing device. In some embodiments, mobile devices 102-104 may also communicate with non-mobile client devices, such as client device 101, or the like. In one embodiment, such communications may include sending and/or receiving messages, searching for, viewing and/or sharing memes, photographs, digital images, audio clips, video clips, or any of a variety of other forms of communications.

Client devices 101-104 may be capable of sending or receiving signals, such as via a wired or wireless network, or may be capable of processing or storing signals, such as in memory as physical memory states, and may, therefore, operate as a server.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104.

Network 105 is configured to couple content server 106, application server 108, or the like, with other computing devices, including, client device 101, and through wireless network 110 to mobile devices 102-104. Network 105 is enabled to employ any form of computer readable media or network for communicating information from one electronic device to another.

The content server 106 may include a device that includes a configuration to provide any type or form of content via a network to another device. Devices that may operate as content server 106 include personal computers, desktop computers, multiprocessor systems, microprocessor-based or programmable consumer electronics, network PCs, servers, and the like. Content server 106 can further provide a variety of services that include, but are not limited to, email services, instant messaging (IM) services, streaming and/or downloading media services, search services, photo services, web services, social networking services, news services, third-party services, audio services, video services, SMS services, MMS services, FTP services, voice over IP (VOIP) services, or the like.

In some embodiments, content server 106 can be, or may be coupled or connected to, a third party server that stores online advertisements for presentation to users. In some embodiments, various monetization techniques or models may be used in connection with sponsored advertising, including advertising associated with user data, as discussed below, where ads can be modified and/or added to content based on the personalization of received content using the locally accessible user profile.

In some embodiments, users are able to access services provided by servers 106 and/or 108. This may include in a non-limiting example, authentication servers, search servers, email servers, social networking services servers, SMS servers, IM servers, MMS servers, exchange servers, photo-sharing services servers, and travel services servers, via the network 105 using their various devices 101-104.

In some embodiments, applications, such as, but not limited to, news applications (e.g., Yahoo! Sports®, ESPN®, Huffington Post®, CNN®, and the like), mail applications (e.g., Yahoo! Mail®, Gmail®, and the like), instant messaging applications, blog, photo or social net-working applications (e.g., Facebook®, Twitter®, Insta-gram®, and the like), search applications (e.g., Yahoo!® Search), and the like, can be hosted by the application server 108, or content server 106 and the like.

Thus, the application server 108 and/or content server 106, for example, can store various types of applications and application related information including application data and other various types of data related to the content and services in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106 and/or 108.

Moreover, although FIG. 1 illustrates servers 106 and 108 as single computing devices, respectively, the disclosure is not so limited. For example, one or more functions of servers 106 and/or 108 may be distributed across one or more distinct computing devices. Moreover, in one embodiment, servers 106 and/or 108 may be integrated into a single computing device, without departing from the scope of the present disclosure.

Figure 2:
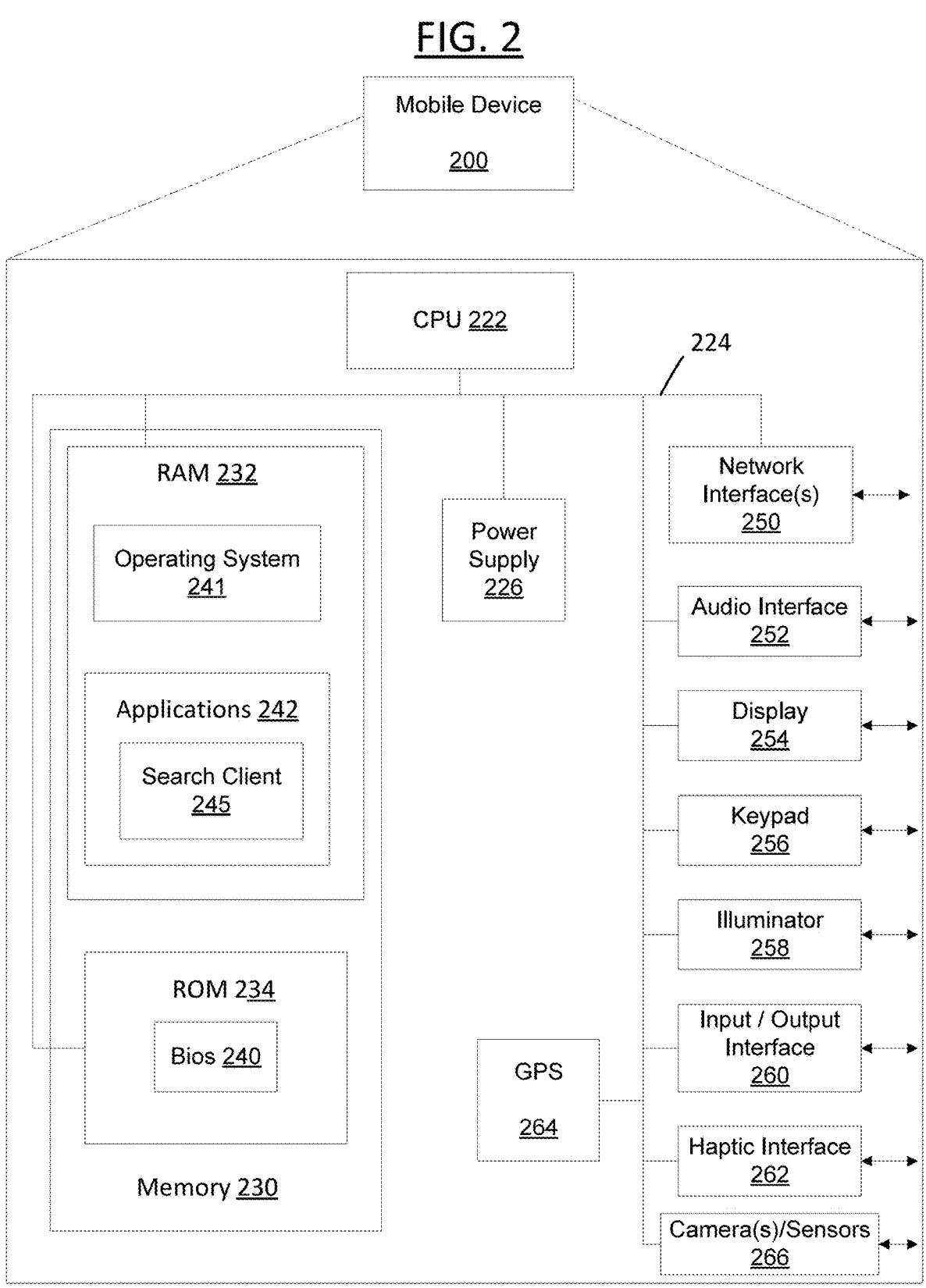
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices 101-104 discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illu-minator 258, an input/output interface 260, a haptic interface 262, an optional global positioning systems (GPS) receiver 264 and a camera(s) or other optical, thermal or electromag-netic sensors 266. Device 200 can include one camera/sensor 266, or a plurality of cameras/sensors 266, as under-stood by those of skill in the art. Power supply 226 provides power to Client device 200.

Client device 200 may optionally communicate with a base station (not shown), or directly with another computing device. Network interface 250 is sometimes known as a transceiver, transceiving device, or network interface card (NIC).

Audio interface 252 can be arranged to produce and receive audio signals such as, for example, the sound of a human voice. Display 254 can, but is not limited to, a include a touch sensitive screen arranged to receive input from an object such as a stylus or a digit from a human hand. Keypad 256 can comprise any input device arranged to receive input from a user. Illuminator 258 may provide a status indication and/or provide light.

Client device 200 also comprises input/output interface 260 for communicating with external devices. Input/output interface 260 can utilize one or more communication tech-nologies, such as USB, infrared, Bluetooth™, or the like. Haptic interface 262 is arranged to provide tactile feedback to a user of the client device.

Optional GPS transceiver 264 can determine the physical coordinates of Client device 200 on the surface of the Earth. In some embodiments however, Client device 200 may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 stores a basic input/output system ("BIOS") 240 for controlling low-level operation of Client device 200. The mass memory also stores an operating system 241 for controlling the operation of Client device 200

Memory 230 further includes one or more data stores, which can be utilized by Client device 200 to store, among other things, applications 242 and/or other information or data. For example, data stores may be employed to store information that describes various capabilities of Client device 200. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with a server and/or another user of another client device. Applications 242 may further include search client 245 that is configured to send, to receive, and/or to otherwise process a search query and/or search result.

Having described the components of the general archi-tecture employed within the disclosed systems and methods, the components' general operation with respect to the dis-closed systems and methods will now be described below.

Figure 3:
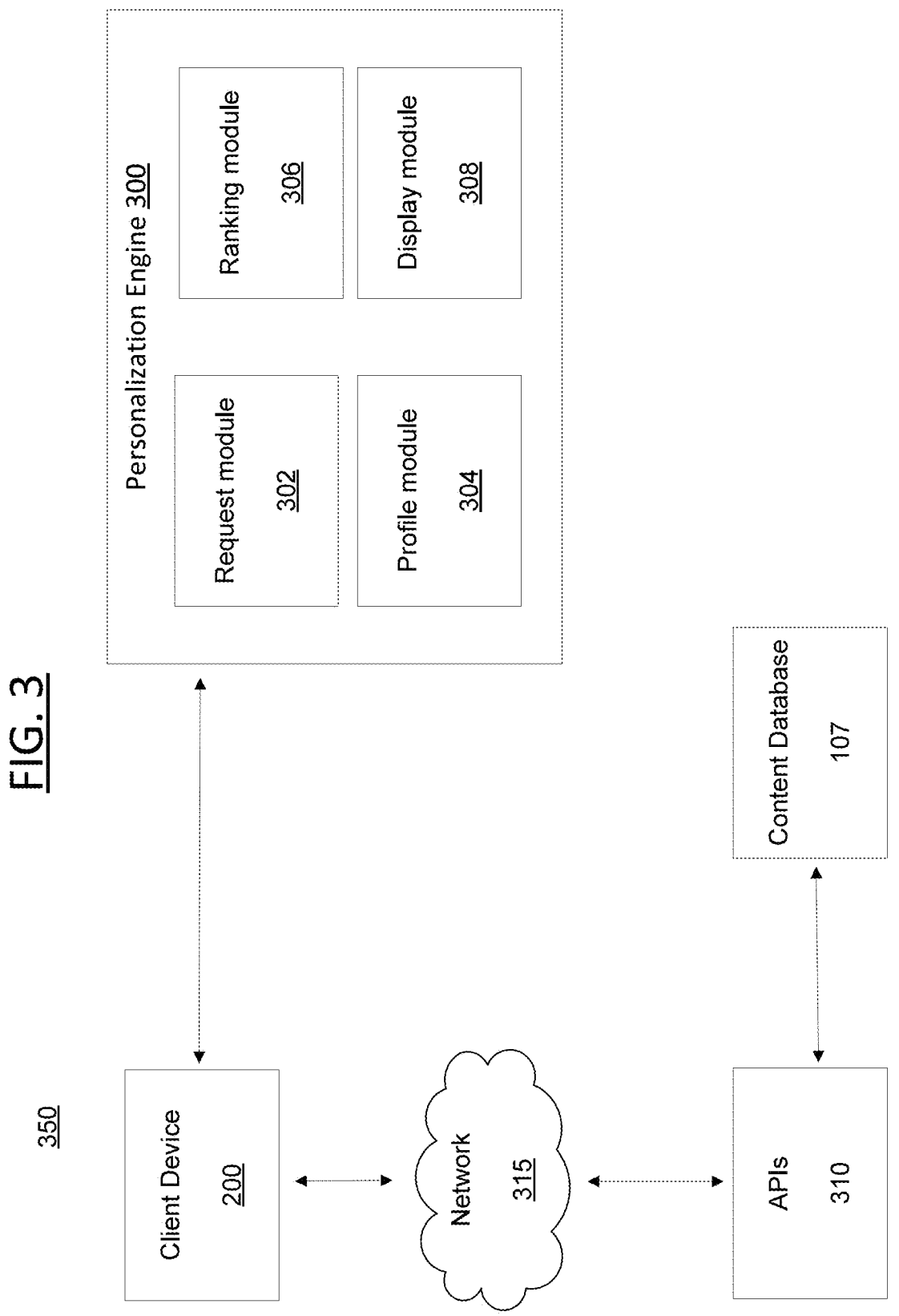
FIG. 3 is a block diagram illustrating components of an exemplary system in accordance with some embodiments of the present disclosure.

FIG. 3 is a block diagram illustrating the components for performing the systems and methods discussed herein. FIG. 3 depicts system 350 which includes client device 200, personalization engine 300, network 315, APIs component 310 and database 107.

According to some embodiments, personalization engine 300 can be a special purpose machine or processor and could be hosted by device 200. In some embodiments, engine 300 can be hosted by a peripheral device connected to device 200.

According to some embodiments, personalization engine 300 can function as an application installed device 200, and in some embodiments, such application can be a web-based application accessed by device 200 over network 315. In some embodiments, personalization engine 300 can be con-figured and/or installed as an augmenting script, program or application (e.g., a plug-in or extension) to another appli-cation.

According to some embodiments, personalization engine 300 includes request module 302, profile module 304, ranking module 306 and display module 308.

In some embodiments, request module 302 provides the request for receiving content to be personalized by engine 300. In some embodiments, as discussed below, request module 302 can operate according to different modes. In some embodiments, one mode involves a specific request for content and a reception of content in response to a request (e.g., a user types in a website's address, or opens an application). In some embodiments, another mode can involve engine 300 detecting that device 200 is connected to a specific type of network, for example, a low-latency, high connectivity environment (e.g., 5G networking), whereby data can be pushed to device 200 over the network automatically. In some embodiments, this mode can be used for offline computing, such as when a user is entering a location without network access (e.g., the user can download content prior to boarding a plane and then have it personalized while offline).

In some embodiments, as discussed below, profile module 304 of engine 300 can operate to build a profile for a user of device 200. In some embodiments, the profile can be built for device 200 rather than a user. In some embodiments, profile module 304 can operate by analyzing real-world and digital activities of the user, compile a profile, and update it based on continuously monitored activities. The updating can be performed recursively after each personalization and/or each request for content, as discussed below in relation to FIG. 4.

In some embodiments, the profile built, updated and maintained can be a universal profile that spans multiple applications, websites and other network resources. In some embodiments, the profile can be partitioned for specific APIs—for example, a specific profile or profile section for each individual network resource.

In some embodiments, as discussed below, the profile operated by profile module 304 comprises a dataset of data and metadata associated with local and/or network information related to a user(s) of device 200 and the services, applications, content rendered and/or executed by device 200.

According to some embodiments, the profile, via profile module 304, can store data for a user of the device 200, e.g., user data, which can include, but is not limited to, user interests, user behavioral information, user patterns, user attributes, user preferences or settings, user demographic information, user location information, user biographic information, and the like, or some combination thereof.

In some embodiments, the user data can also include user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the profile can be any type of information related to a user, the content requested and/or interacted with by the user/device, a device, an application, a service provider, a content provider, whether known or to be known, without departing from the scope of the present disclosure.

According to some embodiments, the profile, via profile module 304, can store data and metadata associated with a user, searches, actions, clicks, conversions, previous recommendations, previous rankings, messages, images, videos, text, products, items and services from an assortment of media, applications and/or service providers and/or platforms, and the like. Accordingly, any other type of known or to be known attribute or feature associated with a user, message, data item, media item, login, logout, website, application, communication (e.g., a message) and/or its transmission over a network, and the like, or some combination thereof, can be saved as part of the data/metadata in the profile.

In some embodiments, as discussed below, ranking module 306 of engine 300 can operate to personalize content received over network 315. In some embodiments, such personalization can involve ranking content items of a received page, and modifying how the page is displayed based on the determined rankings. In some embodiments, such personalization can involve removing, emphasizing, deemphasizing and/or augmenting content from a page or a received content item. In some embodiments, for example, if it is determined the user of device 200 is not interested in a content item (e.g., the ranking is below a threshold), then that content item can be removed from the page when it is displayed.

In some embodiments, as discussed below, the personalization of the content performed by ranking module 306 can additionally be based on metadata related to the content, such as the tags, signals and/or weights associated with the received content. Operations of how content is personalized by engine 300 on device 200 will be discussed in more detail below in relation to database 107 and Process 400 of FIG. 4.

In some embodiments, display module 308 of engine 300 operates to display the personalized content. In some embodiments, display module 308 outputs the personalized content from ranking module 306 for display and/or rendering. In some embodiments, the personalized can be modified to conform to attributes or capabilities of a device, browser user interface (UI), video, page, interface, platform, application or method upon which a user will be viewing the content.

It should be understood that the engine(s) and modules discussed herein are non-exhaustive, as additional or fewer engines and/or modules (or sub-modules) may be applicable to the embodiments of the systems and methods discussed. More detail of the operations, configurations and functionalities of each module, and their role within embodiments of the present disclosure will be discussed below in relation to Process 400 of FIG. 4.

APIs component 310 refers to the application program interfaces (APIs) that are provided by and/or hosted by content server 106 and/or application server 108, as discussed above. For example, if device 200 is running an application for CNN®, then, in some embodiments, application server 106, via a CNN API provided by APIs component 310, can retrieve news content from database 107 and provide it to device 200. As discussed below, the personalization of the content is performed by engine 300 upon its reception of the content over network 315.

Database 107, according to some embodiments, houses the content provided by APIs component 315. Database 107 can be any type of database or memory, and can be associated with a server on a network (e.g., content server 106 or application server 108, as illustrated in FIG. 1). Database 107 comprises a dataset of data and metadata associated with local and/or network information related to services, products, subscriptions, ratings, feedback, content, applications, websites, portals, and the like.

In some embodiments, such information can be stored and indexed in the database 107 independently and/or as a linked or associated dataset. An example of this is look-up table (LUT). As discussed above, it should be understood that the data (and metadata) in the database 107 can be any type of information and type, whether known or to be known, without departing from the scope of the present disclosure.

According to some embodiments, database 107 can store data for network hosted content. In some embodiments, database 107 stores the content related to, provided by and/or created by content server 106 and application server 108. For example, database 107 can serve as a content index for the text, images, videos and/or other types of content and multimedia content that applications and network resources can provide to user devices for display and rendering.

In some embodiments, database 107 can additionally store tags associated with the content. The tags can be any form of metadata, and can indicate information related to, but not limited to, relevance, category, type and the like, or some combination thereof. In some embodiments, database 107 can additionally store anonymized signals (or anonymized information) received, retrieved and/or identified over the network from third party sources (e.g., websites, other users and the like). Such signals can include, but are not limited to, popularity of the content, frequency of the content (e.g., how many sites or articles discuss a topic), recency of the content, and the like.

In some embodiments, the tags and/or anonymized signals can be utilized to determine and/or assign a weight value for specific types and/or specific items of content. This weight information can be stored within database 107 in association with the content, and/or the tags and/or signals, as mentioned above. For example, if a content item relates to a breaking news story (e.g., an election result was just announced for the US Presidency), then this could involve a tag indicating that this is a "breaking news story" related to "Politics" and signals indicating its high popularity. Thus, for example, this story could have a greater weighting than another story related to a city council meeting.

In some embodiments, the weighting can be performed using any known or to be ML probability model, such as, but not limited to, Naïve Bayes, for example. Thus, in some embodiments, the tags and/or anonymized signals can be input into the ML model, whereby weighting for the content is output. In some embodiments, the weighting can also account for the data/metadata of the content item.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of device 200 and the personalization engine 300 (e.g., as device 200 hosts engine 300) to the database of stored resources 107, as discussed in more detail below at least in relation to FIG. 4.

Turning to FIG. 4, Process 400 details a workflow for performing on-device personalization for received content for a user. According to some embodiments, the configuration of engine 300 operating on device 200 (as illustrated in FIG. 3) enables private personalization which is impossible with traditional cloud (or network-based) solutions. The disclosed on-device personalization allows no personally identifiable user data to be shared, which in turn solves user privacy issues/concerns, and adheres to requirements by, for example, General Data Protection Regulation (GDPR)/California Consumer Privacy Act (CCPA) regulations, privacy mandates by Operating System (OS) and browser platforms, and the like.

As mentioned above, traditional cloud (or network) personalization has latency concerns for mobile devices where user interactions are batched to limit the number of radio activations for cloud communication. On-device personalization solves these concerns by performing the user interest tracking and document ranking computations locally. This, therefore, solves existing latency concerns since processing can be performed "on-prem" while also providing an undisrupted user experience in cases where network connectivity is lost. Similarly, because computation has moved from the cloud/network to on-device, a cost savings can be realized on the cloud because less hardware needs to be procured and maintained to power the personalization.

As discussed herein, engine 300's operation of Process 400 involves the creation and maintaining of a local user profile on a device that enables the tracking of a device user's interactions without requiring an identity that is shared back with the cloud. The native device ML acceleration capabilities can be utilized to perform personalization entirely locally, which, for example, allows ranking to occur where network connectivity is lost or turned off. According to some embodiments, the on-device framework embodied by engine 300 can be configured as a personalization software development kit (SDK) for use within device-executed applications, as it communicates with the applications' network-hosted APIs to download content, which is then personalized on the device. This is performed without revealing and/or provided any personally identifiable data about the user.

The discussion of Process 400 will be in reference to system 350 of FIG. 3. It should, however, not be construed as limiting, as additional user/client devices, and servers and/or databases can be implemented without departing from the scope of the instant application.

Process 400 begins with Step 402 where device 200 transmits a request over network 315 for content. As mentioned above, in some embodiments, the request can be based on a user of device 200 requesting a specific page or launching an application installed on device 200. In some embodiments, the request can also be triggered based on a detected low-latency networking environment. For example, when the device 200 detects 5G connectivity, device 200 can send a message over the network to have data pushed to device 200 as it becomes available. This enables device 200 to download content data/metadata and store it for subsequent personalization.

In Step 404, the request is relayed or transmitted to APIs component 310 for analysis and retrieval of the requested content. As mentioned above, component 310 can be hosted by servers 106 and/or 108. Thus, the request can be sent to servers 106 and/or 108, which can be executing the APIs provided by APIs component 310. The request includes instructions for the retrieval of the requested content from database 107. In some embodiments, the request can include information related to a type of content, a type/identity of an API, and/or whether to include or preclude certain portions or types of that content in the response, which the APIs component 310 can utilize as a basis for searching and retrieving content from database 107. As mentioned above, in some embodiments, the retrieved content can include information related to tags, signals and/or weights associated with the requested content.

In some embodiments, Step 404 can involve a server 106/108 receiving the request, and determining which API provided by the APIs component 310 to utilize to retrieve content from database 107. For example, if the user's request is related to a Facebook® request, server 106/108 can identify the Facebook API from APIs component 310 for retrieving the specific Facebook data from database 107.

In Step 406, the retrieved content information is sent back over network 315 from server 106/108 operating APIs component 310 to device 200. The content information includes the content and the associated tags, signals and/or weights. According to some embodiments, the form of the content sent to device 200 is its original format and/or structuring, in that it is formatted, structured and arranged as it was generated by the content provider, and includes all of the content items and objects that originally were included as it was generated by the content provider. In some embodiments, the information related to tags, signals and/or weights included in the database 107 can be sent as a separate and/or accompanying message to the device 200.

In Step 408, device 200 receives the content information, which is then processed by engine 300 in order to personalize the content for the viewing user on device 200, as discussed above. In some embodiments, user data within the user profile stored on the device (e.g., user profile information) is identified and combined with the tags, signals and/or weights information via engine 300 executing a classification algorithm, such as, but not limited to, a Rocchio algorithm. This provides a ranking for the content that can be utilized to modify how the content is configured and/or whether particular items within the content are to be modified, moved or removed.

In some embodiments, Step 408 can involve searching the user profile for user data that corresponds to the content. For example, if the content relates to a fantasy sports application, then the user data within the profile that relates to interactions with the fantasy sports application and/or other fantasy sports applications executing on the user's device can be retrieved.

Thus, for example, Step 408 receives the content information (which includes the content and the applied weights to the content), which is then used to identify user data from the user profile. Using a Rocchio algorithm, for example, the weight data within the content information and the identified user data are combined, which results in a determined personalization of the content (and/or the items included therein).

In some embodiments, Step 408 can also include a weight determination that is to be performed by engine 300 on the device upon receiving the content information. In such embodiments, the content information includes the content and the tags and/or signals, which offloads the processing of the weight determination to the device. Engine 300 then computes the weight, then performs the above steps to determine a ranking/personalization.

In Step 410, engine 300 can modify the content based on the determined personalization from Step 408. As discussed above, this can involve, but is not limited to, ordering the content, modifying/changing how it or a portion of it is displayed, removing portions of it, emphasizing portions of it, and the like, or some combination thereof. And, in Step 412, engine 300 causes the display of the modified content on a display of device 200, as discussed above.

It should be understood that while the discussion herein generally discusses content being received, personalized and displayed/rendered on a device, such content can include any type of known or to be known content, such as, but not limited to, webpages, content items on a page, media items, text, graphics, video, images, multimedia objects, advertisements, and the like.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:

transmitting, by a device of a user over a network, a request for content for the user, wherein the request is triggered based on detecting a specific type of network that enables low-latency downloads, wherein the request initiates content being pushed to the device automatically;

receiving, by the device, content information in response to the request and without exposing to the network user data including user interest data of the user, the content information comprising content and the received content's metadata;

identifying, by the device, using a weight value that is based on the received metadata, the user data from a user profile of the user that is stored on the device, the user data that is identified from the user profile comprising the user interest data;

determining, by the device, after receiving the content and the metadata, a personalization of the received content for the user by combining the user data including the user interest data and the weight value that is based on the received metadata;

modifying, by the device, the content based on the determined personalization; and displaying, on a display of the device, the modified content.

2. The method of claim 1, the identifying of user data within the user profile comprising identifying information related to interactions performed by the user on the device.

3. The method of claim 1, further comprising updating the user data based on the determined personalization.

4. The method of claim 1, further comprising:

receiving the content information from a network database, the receiving of content information comprising receiving content information via an application program interface (API) associated with the content.

5. The method of claim 1, wherein receiving the received content's metadata comprises receiving an indication of the weight value for the content that is based on the metadata.

6. The method of claim 5, further comprising:

identifying, from the metadata, tags associated with the content;

identifying, from the metadata, anonymous information from third party sources; and determining the weight value for the content based on the tags and the anonymized information.

7. The method of claim 6, wherein the tags, anonymized information and weight value are stored in and retrieved from a network database.

8. The method of claim 1, wherein the modification of the content comprises at least one of ordering the content, modifying how the content is displayed and modifying how a portion of it is displayed.

9. The method of claim 1, wherein the request for content is generated by the user interacting with an application installed on the device.

10. The method of claim 1, wherein the modification of the content occurs offline.

11. A non-transitory computer-readable storage medium tangibly encoded with computer-executable instructions, that when executed by a processor associated with a device, performs a method comprising:

transmitting, by the device of a user over a network, a request for content for the user, wherein the request is triggered based on detecting a specific type of network that enables low-latency downloads, wherein the request initiates content being pushed to the device automatically;

receiving, by the device, content information in response to the request and without exposing, to the network, user data including user interest data of the user, the content information comprising content and the received content's metadata;

identifying, by the device, using a weight value that is based on the received metadata, the user data from a user profile of the user that is stored on the device, the user data that is identified from the user profile comprising the user interest data;

determining, by the device, after receiving the content and the metadata, a personalization of the received content for the user by combining the user data including the user interest data and the weight value that is based on the received metadata;

modifying, by the device, the content based on the determined personalization; and displaying, on a display of the device, the modified content.

12. The non-transitory computer-readable storage medium of claim 11, further comprising updating the user data based on the determined personalization.

13. The non-transitory computer-readable storage medium of claim 11, receiving the content information from a network database, the receiving of content information comprising receiving content information via an application program interface (API) associated with the content.

14. The non-transitory computer-readable storage medium of claim 11, further comprising:

identifying, from the metadata, tags associated with the content;

identifying, from the metadata, anonymous information from third party sources; and determining the weight value for the content based on the tags and the anonymized information, wherein the metadata comprises the weight value, wherein the tags, anonymized information and weight value are stored in and retrieved from a network database.

15. The non-transitory computer-readable storage medium of claim 11, wherein the modification of the content comprises at least one of ordering the content, modifying how the content is displayed and modifying how a portion of it is displayed.

16. The non-transitory computer-readable storage medium of claim 11, wherein the request for content is generated by the user interacting with an application installed on the device.

17. The non-transitory computer-readable storage medium of claim 11, wherein the modification of the content occurs offline.

18. A device comprising:

a processor configured to:

transmit, over a network by the device of a user, a request for content for the user, wherein the request is triggered based on detecting a specific type of network that enables low-latency downloads, wherein the request initiates content being pushed to the device automatically;

receive content information in response to the request and without exposing, to the network, user data including user interest data of the user, the content information comprising content and received content's metadata;

identify, using a weight value that is based on the received metadata, the user data from a user profile of the user that is stored on the device, the user data identified from the user profile comprising the user interest data;

determine, after receiving the content and the metadata, a personalization of the received content for the user based on the user data including the user interest data and the weight value that is based on the received metadata;

modify the content based on the determined personalization; and display, on a display of the device, the modified content.

19. The device of claim 18, the processor is further configured to update the user data based on the determined personalization.

20. The device of claim 19, the processor is further configured to receive the content information from a network database via an application program interface (API) associated with the content.

* * * * *